US008837592B2

(12) United States Patent
Lin et al.

(10) Patent No.: US 8,837,592 B2
(45) Date of Patent: Sep. 16, 2014

(54) METHOD FOR PERFORMING LOCAL MOTION VECTOR DERIVATION DURING VIDEO CODING OF A CODING UNIT, AND ASSOCIATED APPARATUS

(75) Inventors: Jian-Liang Lin, Yilan County (TW); Yu-Pao Tsai, Kaohsiung County (TW); Shaw-Min Lei, Taipei County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 348 days.

(21) Appl. No.: 12/987,170

(22) Filed: Jan. 10, 2011

(65) Prior Publication Data

US 2011/0255598 A1      Oct. 20, 2011

Related U.S. Application Data

(60) Provisional application No. 61/323,948, filed on Apr. 14, 2010.

(51) Int. Cl.
*H04N 7/26*       (2006.01)
*H04N 19/51*      (2014.01)
*H04N 19/56*      (2014.01)

(52) U.S. Cl.
CPC ......... *H04N 7/26872* (2013.01); *H04N 7/2684* (2013.01)
USPC .................................................... 375/240.16

(58) Field of Classification Search
CPC ... H04N 7/12; H04N 7/26872; H04N 7/2684; H04N 7/26861; H04N 7/26867; H04N 7/26037; H04N 7/26111; H04N 7/50; H04N 7/26244; H04N 19/00533; H04N 19/00696; H04N 19/00781; H04N 19/00478; H04N 19/00884

USPC .......................................... 375/240.06, 240.16
IPC ............................................................. H04N 7/12
See application file for complete search history.

(56) References Cited

U.S. PATENT DOCUMENTS

2004/0141555 A1*  7/2004  Rault et al. ............... 375/240.16
2006/0251330 A1* 11/2006  Toth et al. ...................... 382/236

(Continued)

OTHER PUBLICATIONS

Analysis and Architecture Design of Variable Block-Size Motion Estimation for H.264/AVC, Ching-Yeh Chen et al., IEEE Transactions on Circuits and Systems, vol. 53, No. 2, Feb. 2006, pp. 578-593.*

(Continued)

*Primary Examiner* — Jay Patel
*Assistant Examiner* — Francis G Geroleo
(74) *Attorney, Agent, or Firm* — Winston Hsu; Scott Margo

(57) ABSTRACT

A method for performing local motion vector derivation during video coding of a coding unit includes: processing a plurality of sub-coding units in the coding unit; and performing motion vector prediction of each of the sub-coding units. More particularly, the step of performing motion vector prediction of each of the sub-coding units further includes: deriving a motion vector of a specific sub-coding unit of the sub-coding units by utilizing at least one motion vector of at least one other sub-coding/coding unit. Thus, the method performs motion compensation on the specific sub-coding unit according to the motion vector of the specific sub-coding unit. An associated apparatus is also provided.

34 Claims, 10 Drawing Sheets

(56) References Cited

U.S. PATENT DOCUMENTS

| | | | |
|---|---|---|---|
| 2007/0014358 A1* | 1/2007 | Tourapis et al. | 375/240.15 |
| 2008/0240248 A1* | 10/2008 | Lee et al. | 375/240.16 |
| 2009/0010553 A1* | 1/2009 | Sagawa | 375/240.16 |
| 2010/0080284 A1* | 4/2010 | Lee et al. | 375/240.16 |
| 2010/0080285 A1* | 4/2010 | Lee et al. | 375/240.16 |
| 2010/0080296 A1* | 4/2010 | Lee et al. | 375/240.16 |
| 2011/0211640 A1* | 9/2011 | Kim et al. | 375/240.16 |

OTHER PUBLICATIONS

Advanced video coding for generic audiovisual services, Series H: Audiovisual and Multimedia Systems Infrastructure of audiovisual services—Coding of moving video, telecommunication standardization sector of ITU, cover page+ p. 39 and p. 156~158, ITU-T Rec. H.264 (Mar. 2005)—Prepublished version, international telecommunication union.

* cited by examiner

METHOD FOR PERFORMING LOCAL MOTION VECTOR DERIVATION DURING VIDEO CODING OF A CODING UNIT, AND ASSOCIATED APPARATUS

CROSS REFERENCE TO RELATED APPLICATIONS

This application claims the benefit of U.S. provisional application No. 61/323,948, which was filed on Apr. 14, 2010 and entitled "MULTIHYPOTHESIS PREDICTION IN VIDEO CODING" and is incorporated herein by reference.

BACKGROUND

The present invention relates to video processing regarding motion compensation, and more particularly, to a method for performing local motion vector derivation during video coding of a coding unit, and to an associated apparatus.

Motion compensation is a technique utilized in encoding and decoding of video data for video compression. With the aid of motion compensation, a current picture can be represented in terms of some portions of one or more reference pictures, where the reference pictures may be previous in time or even from the future. Typically, images can be accurately synthesized from previously transmitted/stored images through motion compensation, and the compression efficiency can be improved. As the coding techniques progresses, the designs regarding newer standards have been introduced to further improve the compression efficiency.

SUMMARY

It is therefore an objective of the claimed invention to provide a method for performing local motion vector derivation during video coding of a coding unit, and to provide an associated apparatus, in order to improve the compression efficiency of video processing.

An exemplary embodiment of a method for performing local motion vector derivation during video coding of a coding unit comprises: processing a plurality of sub-coding units in the coding unit; and performing motion vector prediction of each of the sub-coding units. More particularly, the step of performing motion vector prediction of each of the sub-coding units further comprises: deriving a motion vector of a specific sub-coding unit by utilizing at least one motion vector of at least one other sub-coding/coding unit; and deriving a motion vector of another sub-coding unit in the coding unit by utilizing at least one motion vector that is different from the motion vector utilized for deriving the motion vector of the specific sub-coding unit. In addition, the method further comprises: performing motion compensation on the specific sub-coding unit according to the motion vector of the specific sub-coding unit.

An exemplary embodiment of an apparatus for performing local motion vector derivation during video coding of a coding unit comprises a processing circuit arranged to perform video coding on the coding unit, where the processing circuit comprises a preprocessing module and at least one coding module. The preprocessing module is arranged to process a plurality of sub-coding units in the coding unit and perform motion vector prediction of each sub-coding unit of the coding unit. More particularly, the preprocessing module derives a motion vector of a specific sub-coding unit of the sub-coding units by utilizing at least one motion vector of at least one other sub-coding/coding unit and performs motion compensation on the specific sub-coding unit according to the motion vector of the specific sub-coding unit. In addition, the preprocessing module derives a motion vector of another sub-coding unit in the coding unit by utilizing at least one motion vector that is different from the motion vector utilized for deriving the motion vector of the specific sub-coding unit. Additionally, the coding module is arranged to perform video coding on the coding unit based on motion compensation performed by the preprocessing module.

An exemplary embodiment of a method for performing local motion vector derivation during video coding of a coding unit comprises: receiving the coding unit comprising a plurality of sub-coding units; parsing data of the coding unit; and designating a reference motion vector of a specific sub-coding unit of the sub-coding units according to a predetermined rule, wherein the reference motion vector is utilized as a reference for at least one other sub-coding unit, and is not utilized for motion vector prediction of the specific sub-coding unit.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1A:
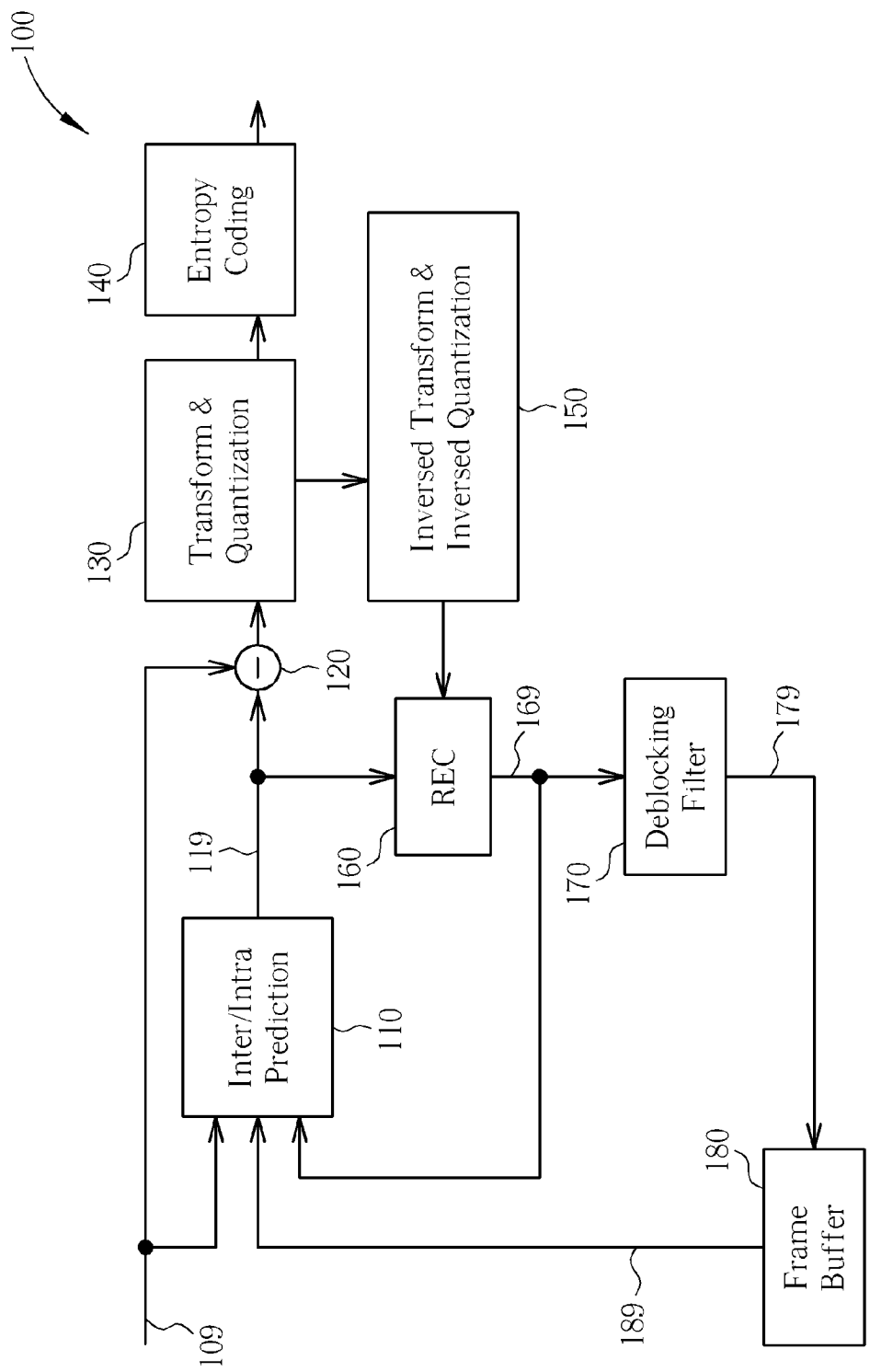
FIG. 1A is a diagram of an apparatus for performing local motion vector derivation during video coding of a coding unit according to a first embodiment of the present invention.

Please refer to FIG. 1A, which illustrates a diagram of an apparatus 100 for performing local motion vector derivation during video coding of a coding unit according to a first embodiment of the present invention. The apparatus 100 comprises an inter/intra prediction module 110 (labeled "Inter/Intra Prediction" in FIG. 1A), an arithmetic unit 120, a transform and quantization module 130 (labeled "Transform & Quantization" in FIG. 1A), an entropy coding circuit 140 (labeled "Entropy Coding" in FIG. 1A), an inversed transform and inversed quantization module 150 (labeled "Inversed Transform & Inversed Quantization" in FIG. 1A), a reconstruction circuit 160 (labeled "REC" in FIG. 1A), a deblocking filter 170, and a frame buffer 180. The apparatus 100 can perform video encoding on an original signal 109, in order to generate an output signal carrying coding results, such as the output of the entropy coding circuit 140. For example, the original signal 109 may represent input video carrying data of the coding unit, and the output of the entropy coding circuit 140 can be an output bitstream (or bit stream).

According to this embodiment, the inter/intra prediction module 110 is arranged to perform inter/intra prediction to generate a prediction signal 119. As shown in FIG. 1A, the arithmetic unit 120 is arranged to perform an arithmetic operation such as a subtraction operation on the original signal 109 and the prediction signal 119 generated by the inter/intra prediction module 110. In addition, the transform and quantization module 130, the entropy coding circuit 140, the inversed transform and inversed quantization module 150, and the reconstruction circuit 160 are arranged to perform transform and quantization, entropy coding, inversed transform and inversed quantization, and reconstruction operations, respectively. As a result, the reconstruction circuit 160 generates a reconstructed signal 169 carrying reconstructed results of the reconstruction operations. Additionally, the deblocking filter 170 is arranged to perform deblocking filtering on the reconstructed signal 169, in order to generate a deblocked signal 179 carrying deblocked video data for being temporarily stored into the frame buffer 180, and the inter/intra prediction module 110 is capable of accessing the deblocked video data carried by a restored signal 189 from the frame buffer 180. This is for illustrative purposes only, and is not meant to be a limitation of the present invention. According to some variations of this embodiment, in a situation where the deblocking filter 170 and the deblocking filtering thereof can be omitted, the reconstructed results carried by the reconstructed signal 169 can be temporarily stored in the frame buffer 180, and the inter/intra prediction module 110 is capable of accessing the reconstructed results through the restored signal 189.

In practice, at least a portion (e.g. a portion or all) of the apparatus 100 can be implemented by utilizing hardware circuits. For example, the apparatus 100 can be implemented with a processing circuit arranged to perform video coding on the coding unit, where the processing circuit may comprise a preprocessing module comprising the inter/intra prediction module 110, and may further comprise at least one coding module comprising the arithmetic unit 120, the transform and quantization module 130, the entropy coding circuit 140, the inversed transform and inversed quantization module 150, the reconstruction circuit 160, and the deblocking filter 170. More particularly, one or more components of the apparatus 100 can be implemented with digital signal processing techniques. This is for illustrative purposes only, and is not meant to be a limitation of the present invention. According to some variations of this embodiment, at least a portion of the apparatus 100 can be implemented by utilizing at least one program module. For example, the processing circuit can be a processor executing a plurality of program modules, where the processor executing a first portion of program modules can perform the same or similar operations of the preprocessing module mentioned above, and the processor executing a second portion of program modules can perform the same or similar operations of the coding module mentioned above.

No matter whether at least a portion (e.g. a portion or all) of the apparatus 100 is implemented by utilizing hardware circuits or by utilizing at least one program module, the apparatus 100 is capable of performing video coding in units of coding units. For example, the coding units can be 16×16 macroblocks (MBs). In another example, the coding units can be coding units of a specific size, where the specific size may be determined in advance, and it is unnecessary that the specific size is equivalent to that of the macroblocks. During processing one of the coding units of at least one image, such as the aforementioned coding unit, predicting one or more motion vectors for the coding unit may be required. In a situation where the coding format is complicated, in order to achieve high performance of coding (e.g. encoding or decoding), it is suggested not to extravagantly spend too much time on digging into calculations of some motion vectors that are required in a preprocessing phase before main coding processing. According to this embodiment, the preprocessing module mentioned above is capable of dividing the aforementioned coding unit into a plurality of sub-coding units (e.g. various kinds of partitions within the coding unit, such as square or non-square partitions) and is capable of performing motion vector prediction of each of the sub-coding units. More particularly, the preprocessing module can obtain a motion vector of a specific sub-coding unit of the sub-coding units by utilizing at least one motion vector of at least one other coded sub-coding/coding unit and perform motion compensation on the specific sub-coding unit according to the motion vector of the specific sub-coding unit. In addition, the coding module mentioned above can perform video coding on the coding unit based on the motion compensation performed by the preprocessing module.

Figure 1B:
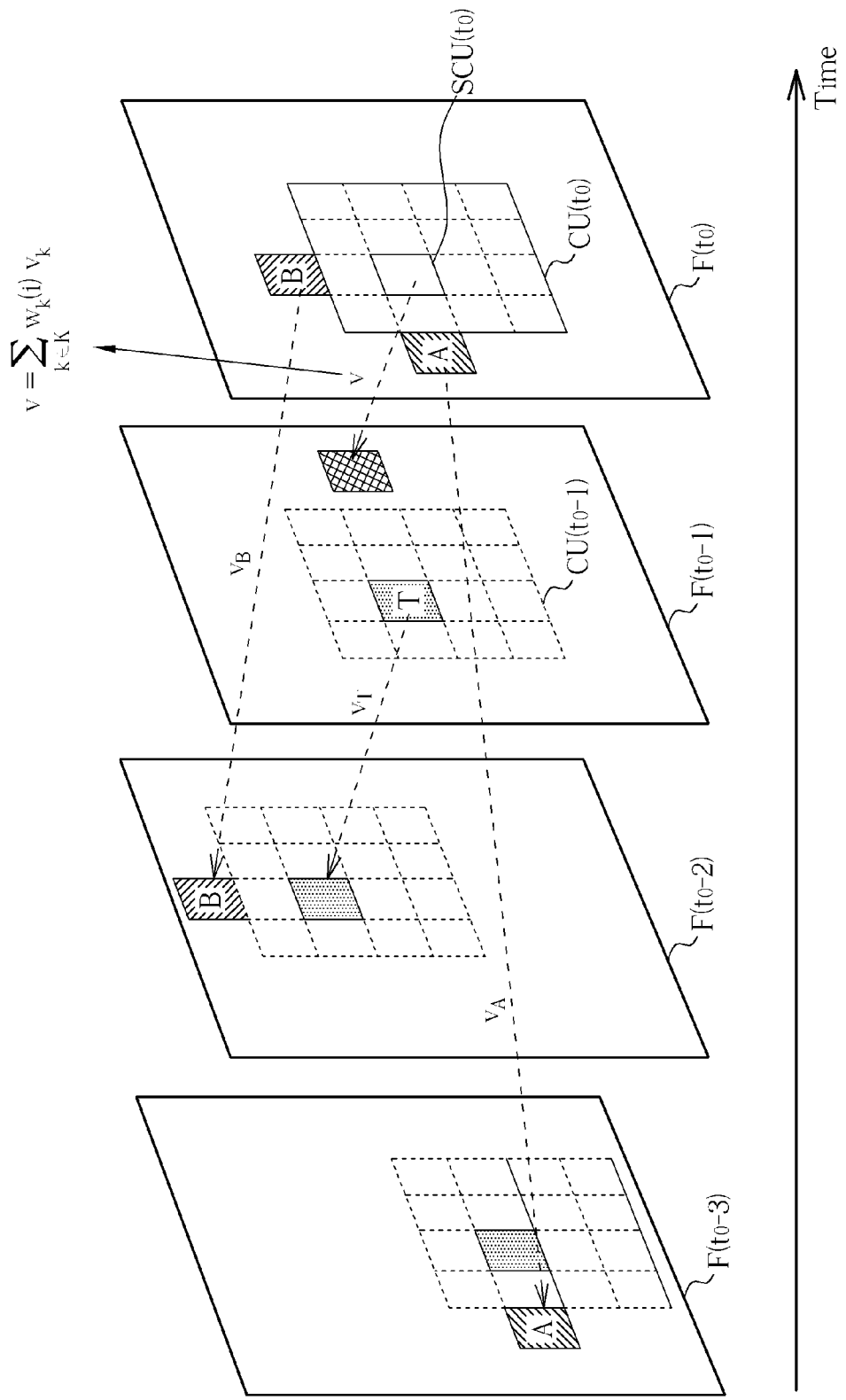
FIG. 1B illustrates exemplary prediction operations of the inter/intra prediction module shown in FIG. 1A according to an embodiment of the present invention.

FIG. 1B illustrates exemplary prediction operations of the inter/intra prediction module 110 shown in FIG. 1A according to an embodiment of the present invention. In this embodiment, the notations $F(t_0-3)$, $F(t_0-2)$, $F(t_0-1)$, and $F(t_0)$ can be utilized for representing a portion of a plurality of subsequent frames $\{F(t)\}$, with the frame $F(t_0)$ being the current frame. The current frame $F(t_0)$ may comprise a plurality of coding units $\{CU(t_0)\}$, and a coding unit $CU(t_0)$ may comprise a plurality of sub-coding units $\{SCU(t_0)\}$, where the notation v may represent the motion vector of the specific sub-coding unit such as the sub-coding unit $SCU(t_0)$ shown in FIG. 1B. Thus, the preprocessing module mentioned above can obtain the motion vector v by utilizing the aforementioned at least one motion vector, such as the motion vectors $v_A$ and $v_B$ of sub-coding units A and B of other coding units (or sub-coding units) within the current frame $F(t_0)$ and the motion vector $v_T$ of a sub-coding unit T of a coding unit $CU(t_0-1)$ within the previous frame $F(t_0-1)$. More particularly, the aforementioned other coding units (or sub-coding units) are some coded coding units (or sub-coding units). For example, in a situation where the coding units are blocks, the coding unit $CU(t_0-1)$ can be a collocated block with respect to the coding unit $CU(t_0)$. In general, the motion vector v of the sub-coding unit $SCU(t_0)$ can be express as follows:

$$v = \Sigma_{k \in K}(w_k(i)v_k);$$

where the index k may vary within the set K, with the notations $v_k$ and $w_k(i)$ representing motion vectors of other sub-coding/coding units (and more particularly, some coded sub-coding/coding units) and associated weighted parameters, respectively. For example, in a situation where the number of possible values of k is equal to one, the motion vector v is obtained by utilizing only one motion vector $v_k$ of only one other sub-coding/coding unit, and more particularly, the weighted parameter $w_k(i)$ can be equal to one, for simplicity. In another example, in a situation where the number of possible values of k is greater than one, the aforementioned at least one other sub-coding/coding unit comprises a plurality of other sub-coding/coding units, and the aforementioned at least one motion vector comprises a plurality of motion vectors $\{v_k\}$ of the plurality of other sub-coding/coding units (and more particularly, some coded sub-coding/coding units), and more particularly, the summation of the weighted parameters $\{w_k(i)\}$ can be equal to one, for simplicity. Please refer to FIG. 2 for further details regarding the above-disclosed operations.

Figure 2:
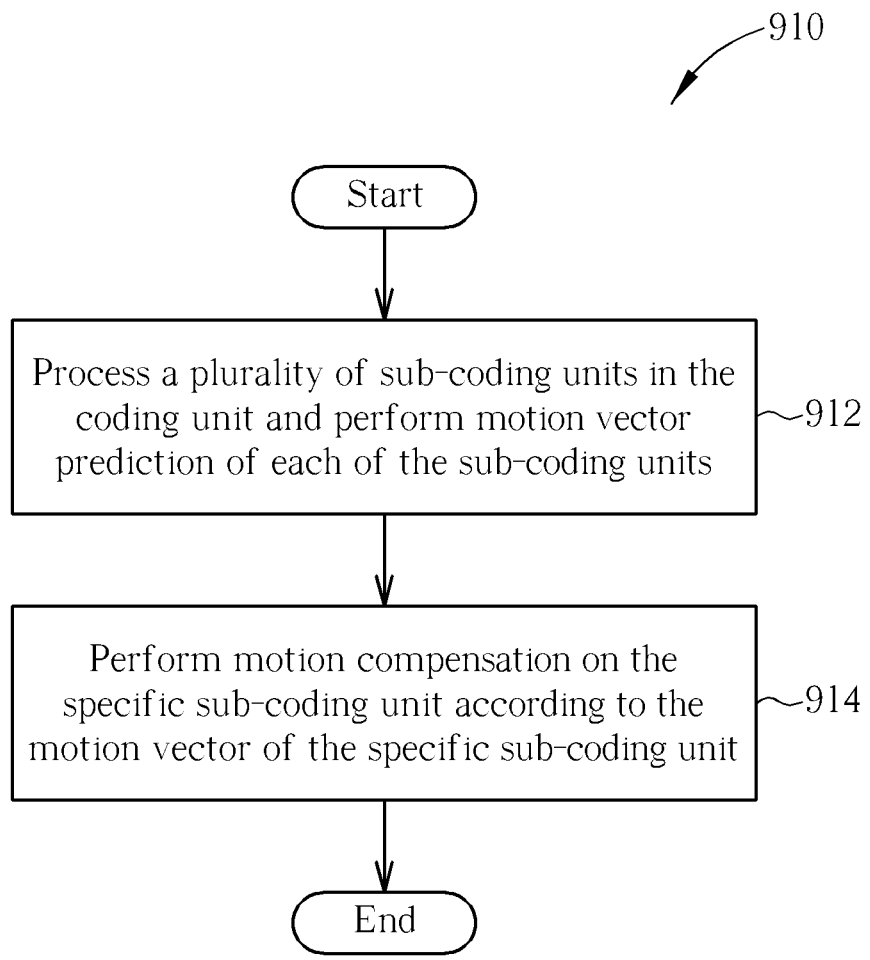
FIG. 2 is a flowchart of a method for performing local motion vector derivation during video coding of a coding unit according to an embodiment of the present invention.

FIG. 2 is a flowchart of a method 910 for performing local motion vector derivation during video coding of a coding unit according to an embodiment of the present invention. The method 910 can be applied to the apparatus 100 shown in FIG. 1A, and more particularly, to the processing circuit mentioned above. The method is described as follows.

In Step 912, the preprocessing module mentioned above processes a plurality of sub-coding units such as the sub-coding units $\{SCU(t_0)\}$ in the coding unit $CU(t_0)$ (e.g. the coding unit under consideration) and performs motion vector prediction of each of the sub-coding units $\{SCU(t_0)\}$. For example, the preprocessing module may receive the coding unit $CU(t_0)$ comprising the plurality of sub-coding units $\{SCU(t_0)\}$, and parse data of the coding unit $CU(t_0)$. In particular, the preprocessing module derives the motion vector v of the specific sub-coding unit $SCU(t_0)$ of the sub-coding units $\{SCU(t_0)\}$ by utilizing at least one motion vector of the aforementioned at least one other sub-coding/coding unit, such as the motion vectors $\{v_k\}$ disclosed above. The preprocessing module may further derive a motion vector of another sub-coding unit in the coding unit $CU(t_0)$ by utilizing at least one motion vector that is different from the motion vector utilized for deriving the motion vector of the specific sub-coding unit $SCU(t_0)$. In a situation where only a single motion vector is utilized for deriving the motion vector of the other sub-coding unit (i.e. the aforementioned "another sub-coding unit" in the coding unit $CU(t_0)$), the motion vector utilized for deriving the motion vector of the other sub-coding unit is not the same as any of the motion vector(s) utilized for deriving the motion vector of the specific sub-coding unit $SCU(t_0)$. In a situation where multiple motion vectors are utilized for deriving the motion vector of the other sub-coding unit, the motion vectors utilized for deriving the motion vector of the other sub-coding unit are not all the same as the motion vector(s) utilized for deriving the motion vector of the specific sub-coding unit $SCU(t_0)$. For example, the aforementioned motion vectors utilized for deriving the motion vector of the other sub-coding unit can be a first set of motion vectors $\{v_a, v_b, v_c\}$, while the aforementioned motion vector(s) utilized for deriving the motion vector of the specific sub-coding unit $SCU(t_0)$ can be a second set of motion vectors $\{v_a, v_b, v_d\}$. The above specific sub-coding unit and the other sub-coding unit are any two sub-coding units in the same coding unit.

Figure 3:
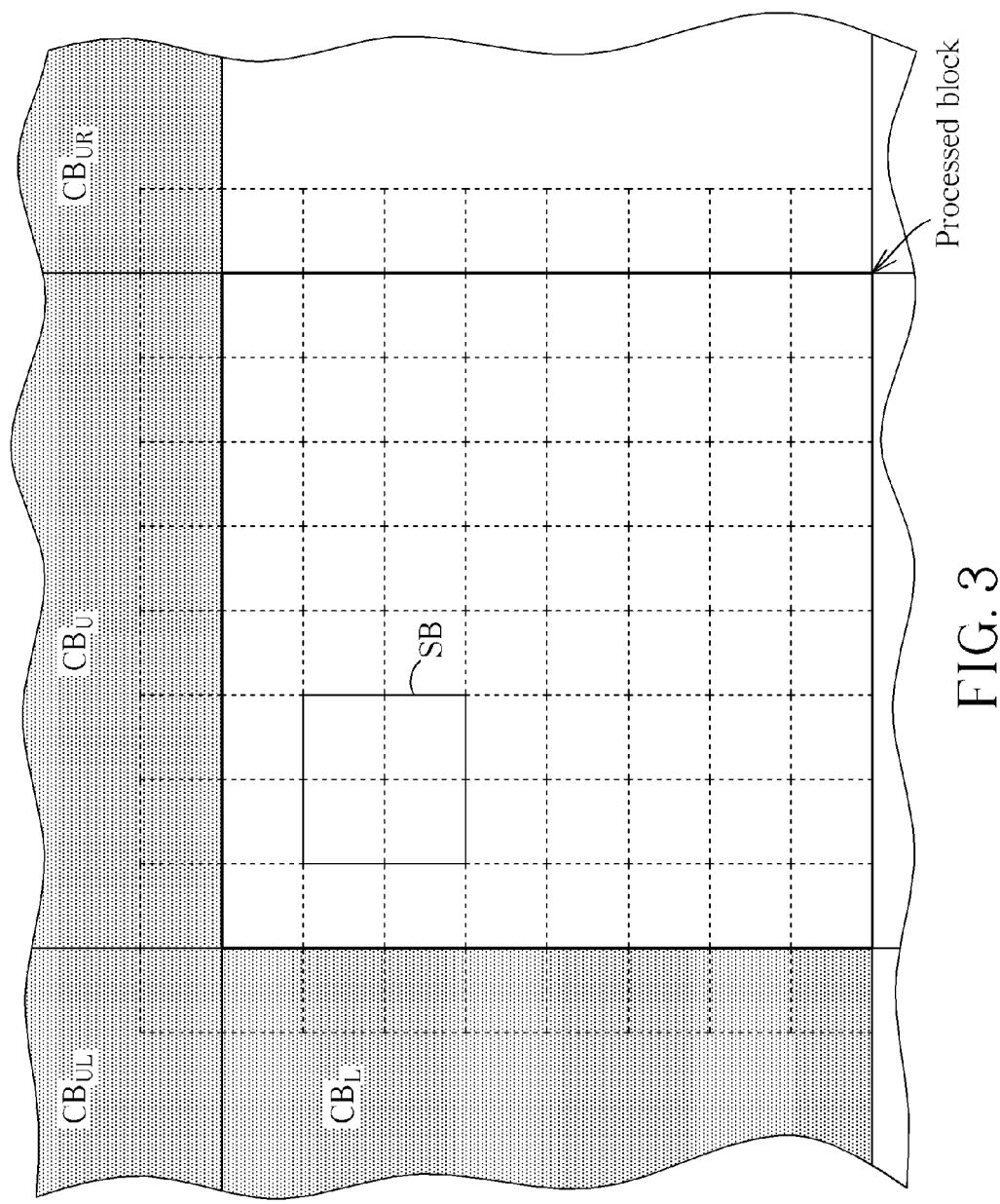
FIG. 3 illustrates exemplary coded blocks involved with the method shown in FIG. 2 according to an embodiment of the present invention.

According to an embodiment of the present invention, such as that shown in FIG. 3, the coding unit $CU(t_0)$ can be a block under processing (labeled "Processed block" in FIG. 3), and the specific sub-coding unit $SCU(t_0)$ can be a sub-block SB, where the shaded portions illustrated in FIG. 3 may represent at least a portion of coded blocks {CB}. Referring to FIG. 3, the coded blocks {CB} may comprise a left coded block $CB_L$, an upper left coded block $CB_{UL}$, an upper coded block $CB_U$, and an upper right coded block $CB_{UR}$, and the motion vectors $\{v_k\}$ may comprise motion vectors of at least a portion (e.g. a portion or all) of the coded blocks {CB}, such as one or more of the coded blocks $CB_L$, $CB_{UL}$, $CB_U$, and $CB_{UR}$.

In Step 914, the aforementioned preprocessing module performs motion compensation on the specific sub-coding unit $SCU(t_0)$ according to the motion vector v of the specific sub-coding unit $SCU(t_0)$. For example, each coding unit (e.g. the coding unit $CU(t_0)$) can be a block, and more particularly, a block comprising an array of pixels, such as an extended macroblock, a macroblock, or a portion of a macroblock. Thus, a sub-coding unit can be referred to as a sub-block. According to an embodiment of the present invention, such as that shown in FIG. 3, the aforementioned preprocessing module can perform motion compensation on the block under processing (labeled "Processed block" in FIG. 3) according to the motion vector v disclosed above, where the motion vector v can be a weighted summation of motion vectors of at least a portion (e.g. a portion or all) of the coded blocks {CB}, such as one or more of the coded blocks $CB_L$, $CB_{UL}$, $CB_U$, and $CB_{UR}$. In this embodiment, the coded blocks {CB} can be motion-compensated blocks.

Figure 4:
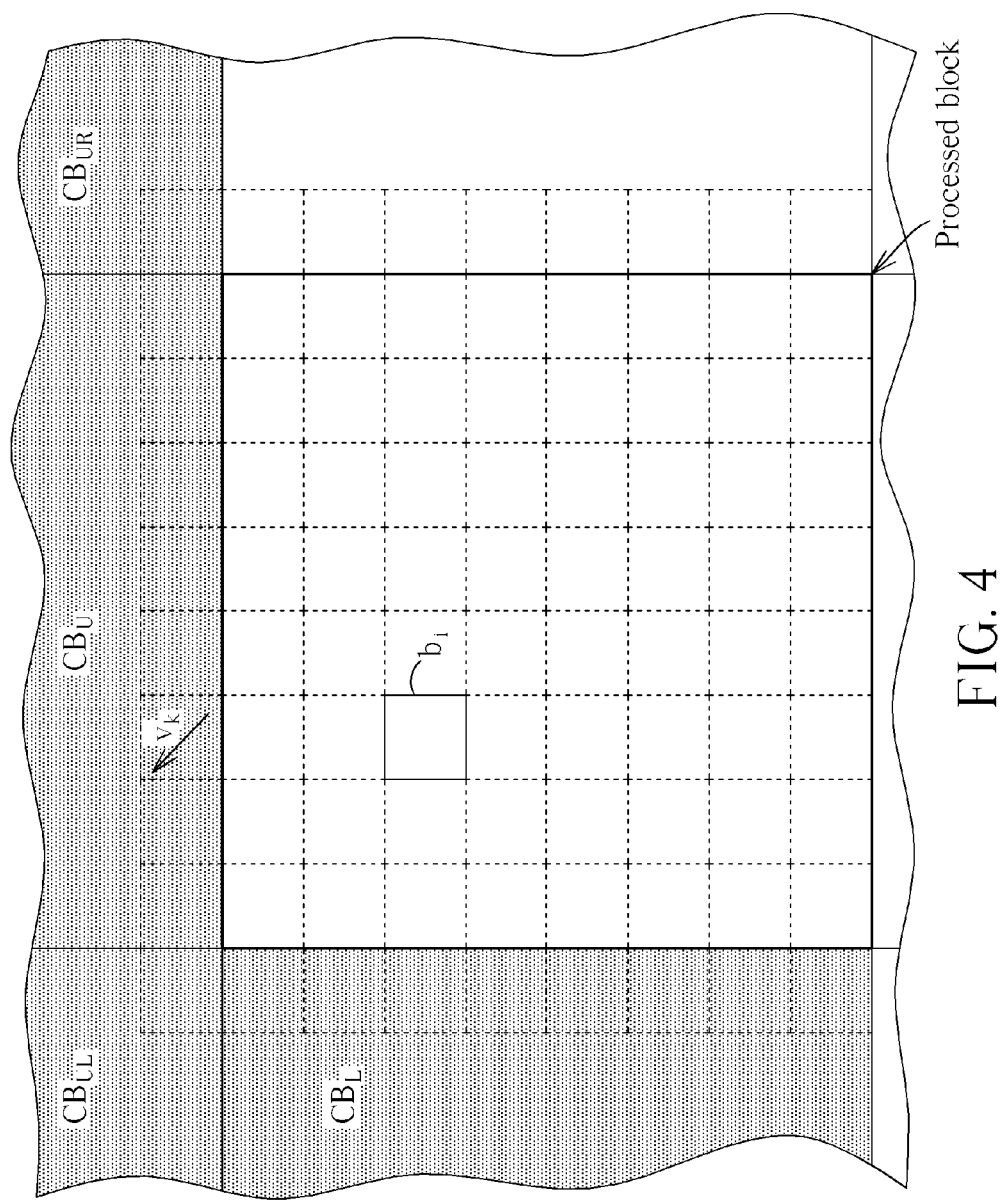
FIG. 4 illustrates some implementation details involved with the method shown in FIG. 2 according to an embodiment of the present invention.

FIG. 4 illustrates some implementation details involved with the method 910 shown in FIG. 2 according to an embodiment of the present invention. According to this embodiment, the preprocessing module can utilize a weighted summation of the plurality of motion vectors (e.g. $\Sigma_{k \in K}(w_k(i)v_k)$ in this embodiment) as the motion vector v of the specific sub-coding unit. For better comprehension, the coded blocks $CB_L$, $CB_{UL}$, $CB_U$, and $CB_{UR}$ can be the same as those shown in FIG. 3, respectively. For example, the plurality of other sub-coding/coding units may comprise one or more of the coded blocks $CB_L$, $CB_{UL}$, $CB_U$, and $CB_{UR}$, and the plurality of motion vectors may comprise one or more of the respective motion vectors $v_L$, $v_{UL}$, $v_U$, and $v_{UR}$ of the coded blocks $CB_L$, $CB_{UL}$, $CB_U$, and $CB_{UR}$.

More particularly, for each sub-block such as the $i^{th}$ sub-block $b_i$ shown in FIG. 4, a motion vector $v(i)$ (or motion vector predictor) can be derived from the motion vectors of the coded blocks {CB}, and can be expressed as follows:

$$v(i) = \Sigma_{k \in K}(w_k(i)v_k);$$

where the index k may vary within the set K, and the notations $v_k$ and $w_k(i)$ represent the $k^{th}$ reference motion vector and associated weighted parameter, respectively. For example, $b_i \in B_m$, and the notation $B_m$ represents the set of sub-blocks of the block under processing (labeled "Processed block" in FIG. 4). As shown in FIG. 4, an exemplary motion vector $v_k$ of the motion vectors $\{v_k\}$ is illustrated within the coded block $CB_U$, which means the motion vectors $\{v_k\}$ comprises the motion vector(s) $\{v_U\}$ of the coded block $CB_U$ in this situation.

In an embodiment, such as a variation of the embodiment shown in FIG. 4, the preprocessing module can utilize optimum Wiener filtering performed on the plurality of motion vectors $\{v_k\}$ to determine respective weighted parameters $\{w_k(i)\}$ for the motion vectors $\{v_k\}$, in order to generate the weighted summation (i.e. $\Sigma_{k \in K}(w_k(i)v_k)$ in this variation). For example, the weighted parameters $\{w_k(i)\}$ can be obtained by utilizing an optimum Wiener filter within the preprocessing module as follows:

$$(w_0^*, \ldots w_K^*) = \arg\min |v^*(i) - \Sigma_{k \in K}(w_k(i)v_k)|;$$

which means the weighted parameters $\{w_k(i)\}$ can be obtained by searching for a set of $(w_0^*, \ldots, w_K^*)$ corresponding to a minimum value of $|v^*(i) - \Sigma_{k \in K}(w_k(i)v_k)|$ during the optimum Wiener filtering performed by the preprocessing module. This is for illustrative purposes only, and is not meant to be a limitation of the present invention. According to a variation of the embodiment shown in FIG. 4, the preprocessing module can determine the respective weighted parameters $\{w_k(i)\}$ for the motion vectors $\{v_k\}$ according to contents of at least one neighboring coding unit, such as the contents of one or more of the coded blocks $CB_L$, $CB_{UL}$, $CB_U$, and $CB_{UR}$, in order to generate the weighted summation (i.e. $\Sigma_{k \in K}(w_k(i) v_k)$ in this variation). According to another variation of the embodiment shown in FIG. 4, the preprocessing module can determine the respective weighted parameters $\{w_k(i)\}$ for the motion vectors $\{v_k\}$ according to contents of the plurality of other sub-coding/coding units, in order to generate the weighted summation (i.e. $\Sigma_{k \in K}(w_k(i) v_k)$ in this variation).

In some other embodiments, such as some variations of the embodiment shown in FIG. 4, the preprocessing module can determine the respective weighted parameters $\{w_k(i)\}$ for the motion vectors $\{v_k\}$ by offline training or by online training, in order to generate the weighted summation (i.e. $\Sigma_{k \in K}(w_k(i) v_k)$ in these variations). According to another variation of the embodiment shown in FIG. 4, the preprocessing module can utilize an average of the plurality of motion vectors $\{v_k\}$ as the motion vector v of the specific sub-coding unit, which means any two of the weighted parameters $\{w_k(i)\}$ are equal to each other. More particularly, in this variation, each of the weighted parameters $\{w_k(i)\}$ is equal to $1/n(K)$, where the $n(K)$ represents the number of possible values of k within the set K.

FIGS. 5A-5D illustrate some implementation details involved with the method 910 shown in FIG. 2 according to different embodiments of the present invention. In these embodiments, in a situation where the number of possible values of k is greater than one, the aforementioned at least one other sub-coding/coding unit still comprises the plurality of other sub-coding/coding units, and the aforementioned at least one motion vector still comprises the plurality of motion vectors $\{v_k\}$ of the plurality of other sub-coding/coding units. However, it is unnecessary that the preprocessing module utilizes a weighted summation such as that disclosed above (e.g. $\Sigma_{k \in K}(w_k(i) v_k)$) as the motion vector v of the specific sub-coding unit. According to these embodiments, the preprocessing module can pre-process the plurality of motion vectors $\{v_k\}$ to obtain the motion vector v of the specific sub-coding unit. For example, the preprocessing module can calculate a median of the plurality of motion vectors, filter the plurality of motion vectors, calculate a weighted summation of the plurality of motion vectors, or perform any of the combinations of calculating the median of the plurality of motion vectors, filtering the plurality of motion vectors, and calculating the weighted summation of the plurality of motion vectors.

In particular, the motion vectors $\{v_k\}$ may comprise at least one motion vector of at least one sub-coding unit. For example, the motion vectors $\{v_k\}$ may comprise at least one motion vector of at least one other sub-coding unit of the same coding unit $CU(t_0)$ (except for the sub-coding unit $SCU(t_0)$ under consideration), such as one or more of the motion vectors $v_A$, $v_B$, $v_C$, and $v_D$ of the sub-coding units A, B, C, and D shown in FIG. 5D. In another example, the motion vectors $\{v_k\}$ may comprise at least one motion vector of at least one sub-coding unit of other coding units, such as one or more of the motion vectors $v_A$, $v_B$, $v_C$, and $v_D$ of the sub-coding units A, B, C, and D shown in any of FIGS. 5A-5C. In another example, the motion vectors $\{v_k\}$ may comprise at least one motion vector derived from a temporal direction, for example, from at least one sub-coding unit in a previous frame. In practice, in a situation where the coding units are blocks, the sub-coding units A, B, C, and D in any of the embodiments shown in FIGS. 5A-5D can be regarded as sub-blocks.

Figure 5A:
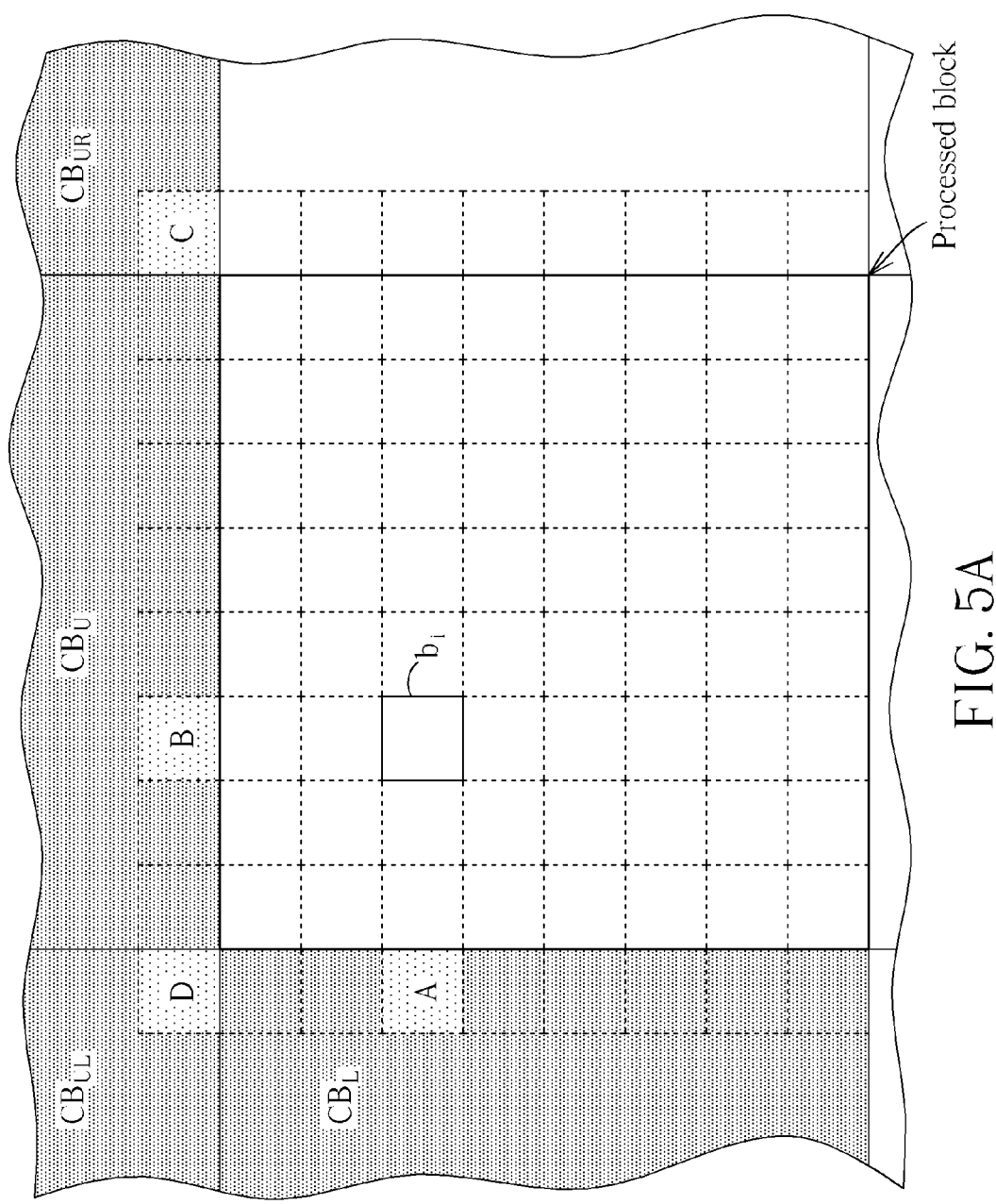
FIGS. 5A-5D illustrate some implementation details involved with the method shown in FIG. 2 according to different embodiments of the present invention.

According to the embodiment shown in FIG. 5A, the sub-coding units A, B, C and D belong to the coded blocks $CB_L$, $CB_U$, $CB_{UR}$, and $CB_{UL}$, respectively. In addition, with regard to the block under processing (labeled "Processed block" in FIG. 5A), the coded blocks $CB_L$, $CB_U$, $CB_{UR}$, and $CB_{UL}$ are the left coded block, the upper coded block, the upper right coded block, and the upper left coded block, respectively. More particularly, with regard to the $i^{th}$ sub-block $b_i$ shown in FIG. 5A, the sub-coding unit A is the closest sub-coding unit among others within the left coded block $CB_L$, the sub-coding unit B is the closest sub-coding unit among others within the upper coded block $CB_U$, the sub-coding unit C is the closest sub-coding unit among others within the upper right coded block $CB_{UR}$, and the sub-coding unit D is the closest sub-coding unit among others within the upper left coded block $CB_{UL}$. Additionally, the preprocessing module pre-processes the motion vectors $v_A$, $v_B$, and $v_C$ of the sub-coding units A, B, and C shown in FIG. 5A to compute the motion vector v of the specific sub-coding unit such as the $i^{th}$ sub-block $b_i$. The motion vector v of this embodiment can be calculated by obtaining the median of the motion vectors $v_A$, $v_B$, and $v_C$, and is expressed as follows:

$$v = \text{Median}(v_A, v_B, v_C);$$

where the notion Median represents the median of the vectors/values in the bracket. The motion vector $v_D$ can replace $v_C$ for calculating the motion vector v if $v_C$ is not available. In some other embodiments, it is possible to assign different weightings to the motion vectors $v_A$, $v_B$, and $v_C$ of the sub-coding units A, B, and C. For example, the weightings (or weighted parameters) can be determined based on the distances between the specific sub-coding unit (e.g. $b_i$) and the sub-coding units A, B, and C. A larger weighting (or weighted parameter) can be assigned to the motion vector corresponding to a shorter distance. In another embodiment, the preprocessing module may filter the motion vectors of predetermined coded sub-coding units to derive the motion vector v.

The preprocessing module can determine the size of the specific sub-coding unit such as the $i^{th}$ sub-block $b_i$ to be a transform size regarding video coding of the coding unit, and the size of the sub-coding units used for deriving the motion vector v of the specific sub-coding unit such as the $i^{th}$ sub-block $b_i$ can be the same as the transform size (e.g. 4 by 4, 8 by 8, 16 by 16, and so on).

Figure 5B:
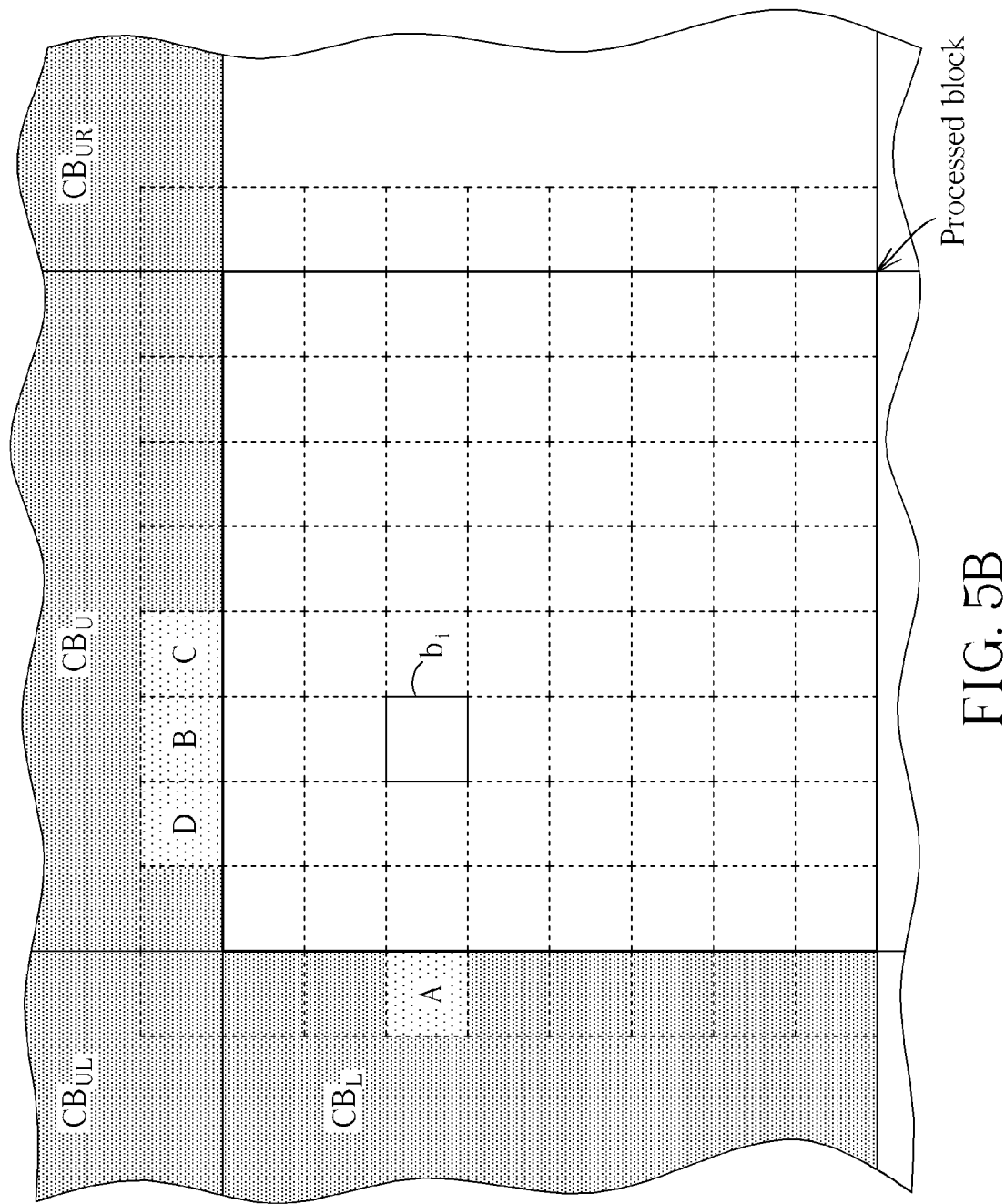

According to the embodiment shown in FIG. 5B, the sub-coding unit A belongs to the left coded block $CB_L$, and the sub-coding units B, C and D may all belong to the upper coded block $CB_U$. More particularly, with regard to the $i^{th}$ sub-block $b_i$ shown in FIG. 5B, the sub-coding unit A is the closest sub-coding unit among others within the left coded block $CB_L$, and the sub-coding unit B is the closest sub-coding unit among others within the upper coded block $CB_U$. In addition, with regard to the sub-coding unit B, the sub-coding unit C is the right adjacent sub-coding unit (if exists) within the upper coded block $CB_U$, and the sub-coding unit D is the left adjacent sub-coding unit (if exists) within the upper coded block $CB_U$. Thus, with regard to the $i^{th}$ sub-block $b_i$ shown in FIG. 5B, the sub-coding units B, C and D are the closest three sub-coding units among others within the upper coded block $CB_U$. In some other embodiments, when the preprocessing module is processing a sub-coding unit of the first column of sub-coding units in the processed block, the sub-coding units D may belong to the upper left coded block $CB_{UL}$, and when the preprocessing module is processing a sub-coding unit of the last column of sub-coding units in the processed block, the sub-coding unit C may belong to the upper right coded block $CB_{UR}$. Additionally, the preprocessing module can derive the motion vector v by utilizing one or more of the motion vectors $v_A$, $v_B$, $v_C$ and $v_D$ of the sub-coding units A, B, C and D shown in FIG. 5B. For example, a median of the motion vectors corresponding to the four predetermined sub-coding units is calculated as the motion vector v of the specific sub-coding unit such as the $i^{th}$ sub-block $b_i$, and the motion vector v of this embodiment can be expressed as follows:

$$v=\mathrm{Median}(v_A,v_B,v_C,v_D).$$

The preprocessing module can determine the size of the specific sub-coding unit to be a transform size regarding video coding of the coding unit, and the size of the sub-coding units such as the sub-blocks shown in FIG. 5B can be the same as the transform size (e.g. 4 by 4, 8 by 8, 16 by 16, and so on). According to some embodiments, such as the embodiment shown in FIG. 5B and some variations thereof, the definition of the median function Median(●) disclosed above may vary in a situation where the number of the motion vectors for calculating the motion vector v by utilizing the median function Median(●) (e.g. the motion vectors $v_A$, $v_B$, $v_C$, and $v_D$ in the embodiment shown in FIG. 5B) is an even number. The sorted results of the motion vectors for calculating the motion vector v by utilizing the median function Median(●) can be written as $v_1, v_2, \ldots, v_{2N}$, which are arranged in order. That is, given that the notations $v_n$ and $v_{(n+1)}$ represent any two adjacent motion vectors of the sorted results $v_1, v_2, \ldots, v_{2N}$, the motion vector $v_n$ is smaller than the motion vector $v_{(n+1)}$ (i.e. $|v_n|<|v_{(n+1)}|$). In these embodiments, the median function Median(●) can be defined as $v_N$, $v_{(N+1)}$, or $(v_N+v_{(N+1)})/2$. For example, the number of these motion vectors is equal to four (i.e. 2N=4) and these motion vectors can be written as $v_1$, $v_2$, $v_3$, and $v_4$, and the median can be $(v_2+v_3)/2$, which means the motion vector v is equivalent to $(v_2+v_3)/2$. In another example, the number of these motion vectors is equal to four and these motion vectors can be written as $v_1$, $v_2$, $v_3$, and $v_4$, and the median can be $v_2$, which means the motion vector v is equivalent to $v_2$. In another example, the number of these motion vectors is equal to four and these motion vectors can be written as $v_1$, $v_2$, $v_3$, and $v_4$, and the median can be $v_3$, which means the motion vector v is equivalent to $v_3$.

Figure 5C:
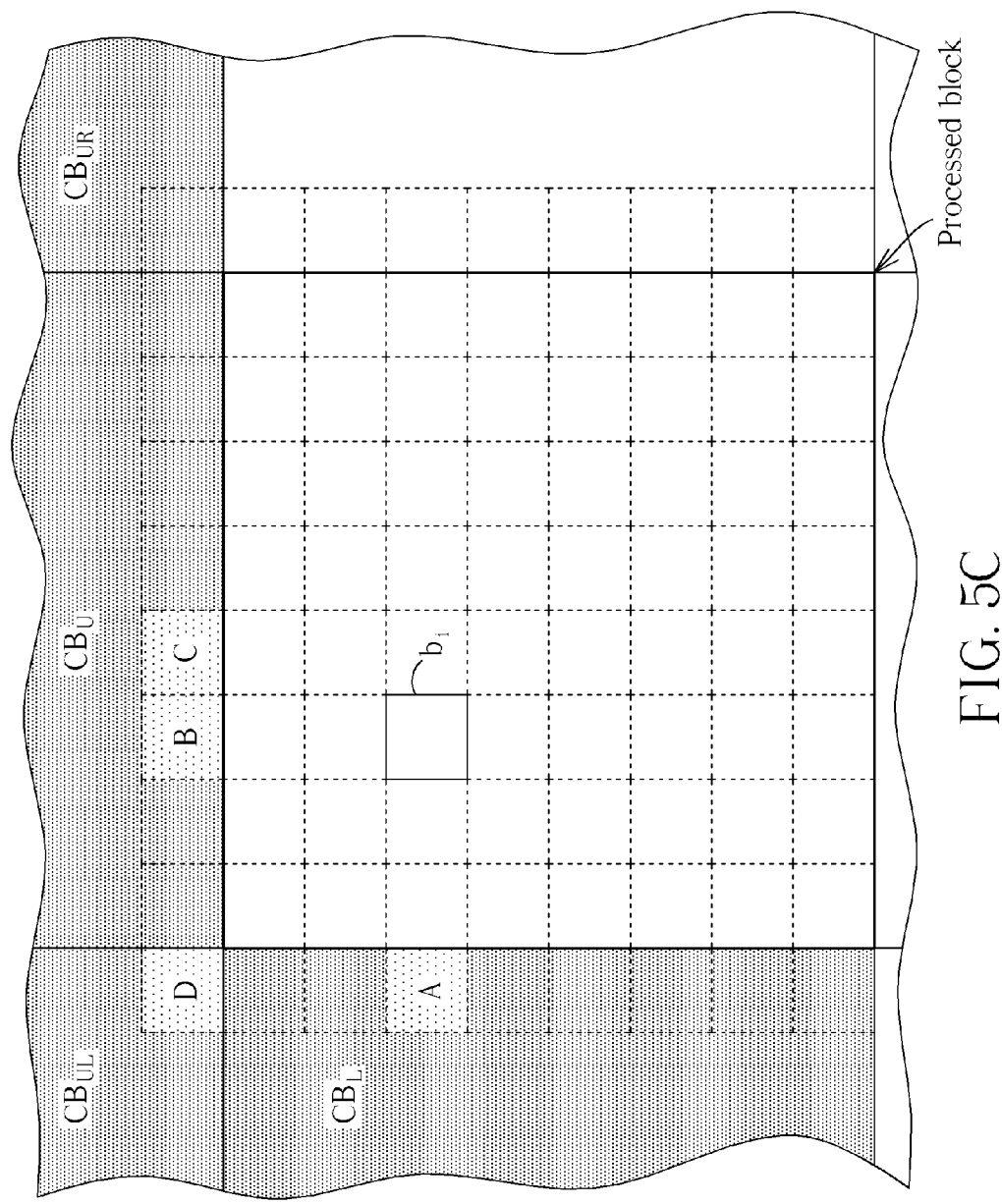

According to the embodiment shown in FIG. 5C, the sub-coding unit A belongs to the left coded block $CB_L$, the sub-coding units B and C belong to the upper coded block $CB_U$, and the sub-coding unit D belongs to the upper left coded block $CB_{UL}$. More particularly, with regard to the $i^{th}$ sub-block $b_i$ shown in FIG. 5C, the sub-coding unit A is the closest sub-coding unit among others within the left coded block $CB_L$, the sub-coding unit B is the closest sub-coding unit among others within the upper coded block $CB_U$, and the sub-coding unit D is the closest sub-coding unit among others within the upper left coded block $CB_{UL}$. In addition, with regard to the sub-coding unit B, the sub-coding unit C is the right adjacent sub-coding unit (if exists) within the upper coded block $CB_U$. Additionally, the preprocessing module can derive the motion vector v by utilizing one or more of the motion vectors $v_A$, $v_B$, $v_C$, and $v_D$ of the sub-coding units A, B, C and D shown in FIG. 5C. For example, the motion vector v of the specific sub-coding unit such as the $i^{th}$ sub-block $b_i$ can be calculated by finding the median of the motion vectors $v_A$, $v_B$, and $v_C$, or the median of the motion vectors $v_A$, $v_B$, and $v_D$) if the motion vector $v_C$ is not available. The motion vector v of this embodiment can be expressed as follows:

$$v=\mathrm{Median}(v_A,v_B,v_C).$$

The preprocessing module can determine the size of the specific sub-coding unit to be a transform size regarding video coding of the coding unit, and the size of the sub-coding units such as the sub-blocks shown in FIG. 5C can be the same as the transform size (e.g. 4 by 4, 8 by 8, 16 by 16, and so on).

According to a variation of any of the embodiments shown in FIGS. 5B-5C, the preprocessing module can derive the motion vector v by utilizing more or less motion vectors of the sub-coding units. Various combinations of motion vectors that belong to one or more sub-coding units may be used to derive the motion vector v of the specific sub-coding unit. The main concept here is that the motion vector v of the specific sub-coding unit is locally derived from a set of motion vectors, and this set of motion vectors may be different from the set of motion vectors for deriving the motion vector of another sub-coding unit in the same processing block.

Figure 5D:
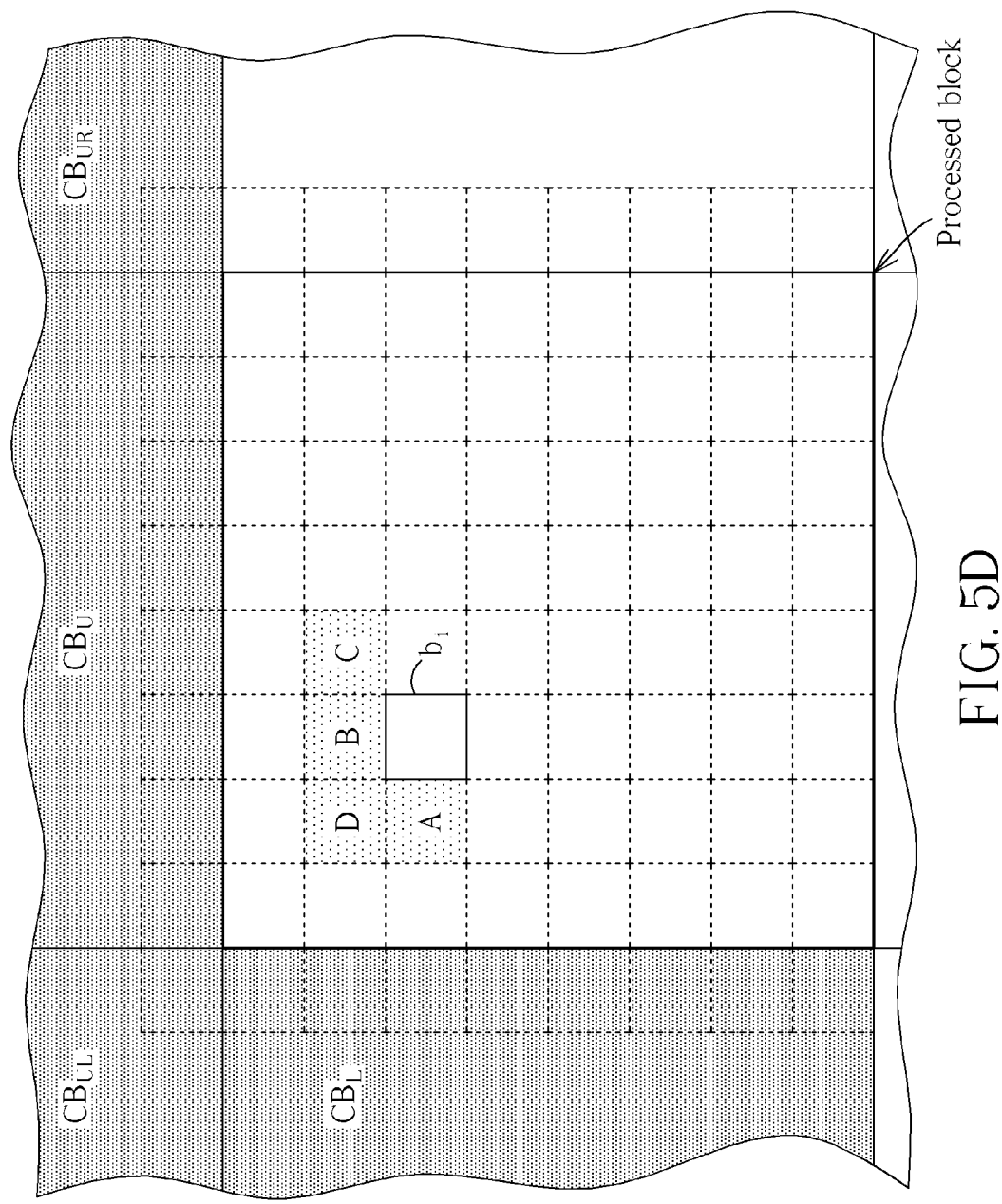

According to the embodiment shown in FIG. 5D, the preprocessing module can utilize some motion vectors of a portion of the plurality of sub-coding units mentioned in Step 912 to derive a motion vector of another sub-coding unit in the same coding unit. Referring to FIG. 5D, the sub-coding units A, B, C, and D belong to the block under processing (labeled "Processed block" in FIG. 5D), where the sub-coding units A, B, C, and D are a portion the plurality of sub-coding units mentioned in Step 912. More particularly, with regard to the $i^{th}$ sub-block $b_i$ shown in FIG. 5D, the sub-coding unit A is the left adjacent sub-coding unit, the sub-coding unit B is the upper adjacent sub-coding unit, the sub-coding unit C is the upper right adjacent sub-coding unit, and the sub-coding unit D is the upper left adjacent sub-coding unit. In this embodiment, the preprocessing module can utilize the median of the motion vectors $v_A$, $v_B$, and $v_C$ of the sub-coding units A, B, and C shown in FIG. 5D as the motion vector v of the specific sub-coding unit such as the $i^{th}$ sub-block $b_i$, and the motion vector v of this embodiment can be expressed as follows:

$$v=\mathrm{Median}(v_A,v_B,v_C).$$

The processing module can utilize the median of the motion vectors $v_A$, $v_B$, and $v_D$ of the sub-coding units A, B, and D shown in FIG. 5D as the motion vector v of the specific sub-coding unit when the sub-coding unit C is not available.

The preprocessing module can determine the size of the specific sub-coding unit to be a transform size regarding video coding of the coding unit, and the size of the sub-coding units such as the sub-blocks shown in FIG. 5D can be the same as the transform size (e.g. 4 by 4, 8 by 8, 16 by 16, and so on).

According to an embodiment, such as a variation of the embodiment shown in FIG. 5D, the preprocessing module can utilize the median of the motion vectors $v_A$, $v_B$, $v_C$ and $v_D$ of the sub-coding units A, B, C and D shown in FIG. 5D as the motion vector v of the specific sub-coding unit such as the $i^{th}$ sub-block $b_i$, and the motion vector v of this embodiment can be expressed as follows:

$$v=\mathrm{Median}(v_A,v_B,v_C,v_D).$$

Similar descriptions are not repeated in detail for this embodiment. According to some embodiments, such as the above embodiment and some variations thereof, the definition of the median function Median(●) disclosed above may vary in a situation where the number of the motion vectors for calculating the motion vector v by utilizing the median function Median(●) is an even number. Similarly, the sorted results of the motion vectors for calculating the motion vector v by utilizing the median function Median(●) can be written as $v_1, v_2, \ldots, v_{2N}$, and in these embodiments, the median function Median(●) can be defined as $v_N$, $v_{(N+1)}$, or $(v_N + v_{(N+1)})/2$. Similar descriptions are not repeated in detail for these embodiments.

According to some variations of the embodiments shown in FIGS. 5A-5D, the preprocessing module may selectively operate in different modes such as Modes 1, 2, 3, and 4, where the respective operations of Modes 1, 2, 3, and 4 can be the same as or similar to those disclosed in the embodiments shown in FIGS. 5A-5D, respectively. For example, in Mode 1, the preprocessing module can operate according to the same method of the embodiment shown in FIG. 5A, while in another mode such as any of Modes 2, 3, and 4, the preprocessing module can operate according to the same method of the associated embodiment such as the corresponding embodiment within those shown in FIGS. 5B-5D, respectively.

According to a variation of any of the embodiments shown in FIGS. 5A-5D, in Step 912, the preprocessing module can divide the coding unit into the plurality of sub-coding units based on at least one mode of at least one neighboring coding unit, such as Modes 1, 2, 3, and/or 4 of one or more of the coded blocks $CB_L$, $CB_U$, $CB_{UR}$, and $CB_{UL}$. According to another variation of any of the embodiments shown in FIGS. 5A-5D, in Step 912, the preprocessing module can divide the coding unit into the plurality of sub-coding units based on contents of at least one neighboring coding unit such as one or more of the coded blocks $CB_L$, $CB_U$, $CB_{UR}$, and $CB_{UL}$.

According to some variations of any of the embodiments/variations disclosed above, no matter whether the preprocessing module utilizes a weighted summation (e.g. $\Sigma_{k \in K}(w_k(i) v_k)$) or utilizes a median (e.g. Median($v_A$, $v_B$, $v_C$) or Median ($v_A$, $v_B$, $v_C$, $v_D$)) as the motion vector v of the specific sub-coding unit, each of the aforementioned at least one other sub-coding/coding unit is a coded sub-coding/coding unit. For example, in a portion of these variations, the aforementioned at least one other sub-coding/coding unit may comprise at least one spatially coded sub-coding/coding unit and/or at least one temporally coded sub-coding/coding unit. In another example, in a portion of these variations, each of the aforementioned at least one other sub-coding/coding unit can be a motion-compensated sub-coding/coding unit.

Figure 6:
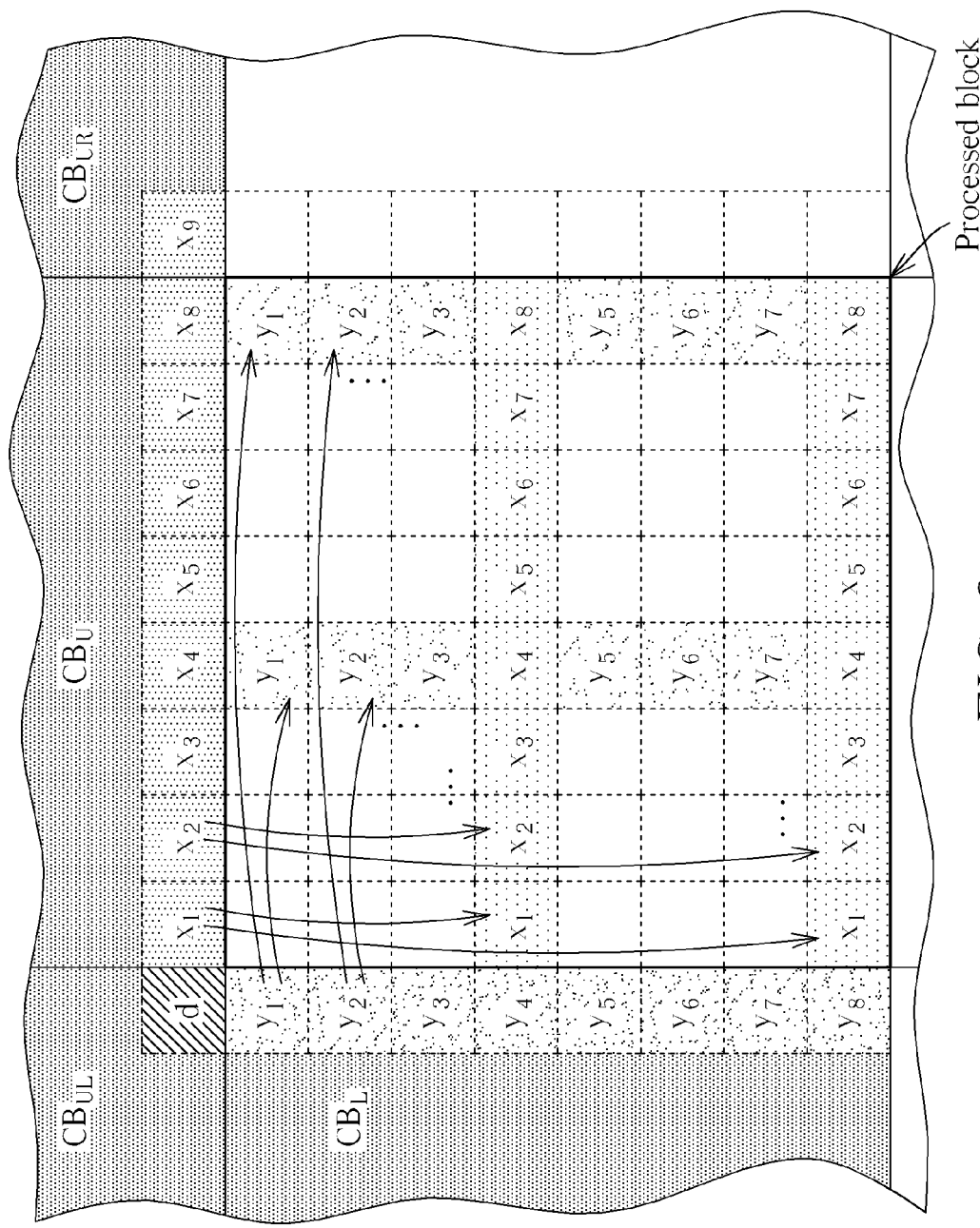
FIG. 6 illustrates some implementation details involved with the method shown in FIG. 2 according to an embodiment of the present invention.

FIG. 6 illustrates some implementation details involved with the method 910 shown in FIG. 2 according to an embodiment of the present invention. According to this embodiment, the preprocessing module still divides the coding unit $CU(t_0)$ (e.g. the coding unit under consideration) into the plurality of sub-coding units such as the sub-coding units $\{SCU(t_0)\}$ and performs motion vector prediction for each of the sub-coding units $\{SCU(t_0)\}$ in Step 912. However, when the preprocessing module obtains the motion vector v of the specific sub-coding unit $SCU(t_0)$ by utilizing multiple motion vectors such as the motion vectors $\{v_k\}$ disclosed above, a motion vector (e.g. a reference motion vector) has to be designated for each sub-coding unit so it can be later referenced by other sub-coding unit(s)/coding unit(s). The rule for motion vector designation can be arbitrary as it just needs to be agreed and complied by both the encoders and decoders. Some predetermined rule for motion vector designation include motion vector predictor defined in H.264, motion vector prediction defined in H.264 but with motion vector scaling, padding from the left block, padding from the upper block, and padding from left or upper block. According to an embodiment of padding from left or upper block, the preprocessing module obtains the motion vector v of the specific sub-coding unit $SCU(t_0)$ and designates a motion vector utilizing the motion vector of a sub-coding unit of another coding unit (except for the coding unit $CU(t_0)$ under consideration), such as a coded sub-coding unit of an adjacent coding unit $CU_{ADJ}(t_0)$ that is adjacent to the coding unit $CU(t_0)$. More particularly, with regard to the specific sub-coding unit $SCU(t_0)$, the sub-coding unit of the other coding unit (e.g. the coding unit $CU_{ADJ}(t_0)$) is the closest sub-coding unit within the other coding unit, and the preprocessing module can utilize the motion vector of the closest sub-coding unit within the other coding unit (e.g. the coding unit $CU_{ADJ}(t_0)$) as the motion vector designated for the specific sub-coding unit $SCU(t_0)$. The motion vector designated to a coding unit or a sub-coding unit is mainly used as a reference motion vector for other coding units or sub-coding units, where it is not necessary to be used for motion prediction.

As shown in FIG. 6, with regard to the coding unit $CU(t_0)$ such as the block under processing (labeled "Processed block" in FIG. 6), the adjacent coding units $\{CU_{ADJ}(t_0)\}$ that are involved in this embodiment may comprise at least a portion of the left coded block $CB_L$, the upper coded block $CB_U$, the upper right coded block $CB_{UR}$, and the upper left coded block $CB_{UL}$, where the sub-coding units in these coded blocks $CB_L$, $CB_U$, $CB_{UR}$, and $CB_{UL}$ can be regarded as sub-blocks. For better comprehension, the motion vectors $y_1$, $y_2$, $y_3$, $y_4$, $y_5$, $y_6$, $y_7$, and $y_8$ of the rightmost column of sub-coding units within the left coded block $CB_L$ are labeled on the rightmost column of sub-coding units, respectively. Similarly, the motion vectors $x_1$, $x_2$, $x_3$, $x_4$, $x_5$, $x_6$, $x_7$, and $x_8$ of the bottommost row of sub-coding units within the upper coded block $CB_U$ are labeled on the bottommost row of sub-coding units, respectively. In addition, the motion vector d of the bottom right sub-coding unit within the upper left coded block $CB_{UL}$ and the motion vector $x_9$ of the bottom left sub-coding unit within the upper right coded block $CB_{UR}$ are labeled thereon, respectively.

According to this embodiment, the preprocessing module receives the coding unit $CU(t_0)$ comprising a plurality of sub-coding units $\{SCU(t_0)\}$ and parses the data of the coding unit $CU(t_0)$, and designates a reference motion vector of the specific sub-coding unit $SCU(t_0)$ of the sub-coding units $\{SCU(t_0)\}$ according to a predetermined rule, where the reference motion vector is utilized for reference by at least one other sub-coding unit, and is not utilized for motion vector prediction of the specific sub-coding unit $SCU(t_0)$. With reference motion vectors being utilizing for reference, the preprocessing module can operate rapidly, having no need to wait for completion of any complicated calculation regarding the real motion vector of the specific sub-coding unit SCU $(t_0)$. In practice, the preprocessing module can designate this motion vector (i.e. the reference motion vector mentioned above) to be a motion vector of at least one portion of an adjacent coding unit. More particularly, the at least one portion of the adjacent coding unit can be a portion that is most close to the specific sub-coding unit within the neighboring coding unit.

For example, suppose that the specific sub-coding unit $SCU(t_0)$ represents the $j^{th}$ sub-block of a certain row of sub-blocks in the block under processing (e.g. the processed block shown in FIG. 6), where j may vary from 1 to 8. In a first designation rule such as "vertical designation", the preprocessing module can utilize the motion vector $x_j$ of the closest sub-coding unit within the upper coded block $CB_U$ as the reference motion vector of the specific sub-coding unit SCU $(t_0)$.

In another example, suppose that the specific sub-coding unit $SCU(t_0)$ represents the $j^{th}$ sub-block of a certain column of sub-blocks in the block under processing (e.g. the processed block shown in FIG. 6), where j may vary from 1 to 8. In a second designation rule such as "horizontal designation", the preprocessing module utilizes the motion vector $y_j$ of the closest sub-coding unit within the left coded block $CB_L$ as the reference motion vector of the specific sub-coding unit SCU($t_0$).

In another example, a third designation rule such as "hybrid designation" can be selected for determining the reference motion vector. Suppose that the specific sub-coding unit SCU($t_0$) represents the $j^{th}$ sub-block of the fourth/eighth row of sub-blocks in the block under processing (labeled "Processed block" in FIG. 6), where j may vary from 1 to 8. Referring to FIG. 6, as illustrated with the arrow pointing to the $j^{th}$ sub-block of the fourth/eighth row of sub-blocks, the preprocessing module utilizes the motion vector $x_j$ of the closest sub-coding unit within the upper coded block $CB_U$ as the reference motion vector of the specific sub-coding unit SCU($t_0$). In addition, suppose that the specific sub-coding unit SCU($t_0$) represents the $j^{th}$ sub-block of the fourth/eighth column of sub-blocks in the block under processing (labeled "Processed block" in FIG. 6), where j may vary from 1 to 7 except for 4. Referring to FIG. 6, as illustrated with the arrow pointing to the $j^{th}$ sub-block of the fourth/eighth column of sub-blocks, the preprocessing module utilizes the motion vector $y_j$ of the closest sub-coding unit within the left coded block $CB_L$ as the reference motion vector of the specific sub-coding unit SCU($t_0$). In this embodiment, the reference motion vectors of the remaining sub-coding units within the coding unit CU($t_0$) can be obtained by utilizing the same or similar method in any of the embodiments/variations disclosed above. Similar descriptions are not repeated in detail for this embodiment.

Please note that, in some embodiments such as some variations of the above embodiment, the preprocessing module can control the operations disclosed above by utilizing a flag, and more particularly, by explicitly sending a flag. For example, an encoder implemented according to one of these embodiments may send a flag indicating whether the designation rule to be applied is one of "vertical designation" and "horizontal designation" (and even "hybrid designation"), so by receiving a bitstream carrying the flag, an associated decoder can be notified of the designation rule to be applied.

In addition, in some embodiments, various motion vector designation methods disclosed above (e.g. "vertical designation" and "horizontal designation", and even "hybrid designation") can be utilized for performing local motion vector derivation. For example, in a situation where "vertical designation" is applied, the motion vectors of each row of sub-coding units are derived from the corresponding locations within the upper coded block $CB_U$ (e.g. the closest sub-coding unit within the upper coded block $CB_U$), respectively.

It is an advantage of the present invention that the encoders and decoders can properly perform local motion vector derivation, and more particularly, can derive a motion vector from the motion vectors of sub-coding units selected by a predefined rule to achieve a better compression performance. As a result of utilizing the present invention method and apparatus, both the motion vector prediction operations and the motion compensation operations can be performed without introducing any related art problem such as low coding efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing local motion vector derivation during video coding of a coding unit, the method comprising:
   processing a plurality of sub-coding units in the coding unit;
   performing motion vector prediction on each of the sub-coding units, wherein the step of performing motion vector prediction on each of the sub-coding units further comprises:
      deriving a motion vector of a specific sub-coding unit by utilizing at least one motion vector of one or more first sub-coding units in the coding unit or other coding unit, wherein the specific sub-coding unit is not positioned in the corner of the coding unit, and at least one of the one or more first sub-coding units is not spatially adjacent to the specific sub-coding unit; and
      deriving a motion vector of another sub-coding unit in the coding unit by utilizing at least one motion vector of one or more second sub-coding units in the coding unit or other coding unit, wherein at least one of the one or more second sub-coding units is not spatially adjacent to the another sub-coding unit, and at least one of the at least one of the one or more second sub-coding unit is different from the at least one of the one or more first sub-coding unit; and
   performing motion compensation on the specific sub-coding unit according to the motion vector of the specific sub-coding unit.

2. The method of claim 1, wherein the at least one motion vector of the one or more first sub-coding units comprises a plurality of motion vectors of a plurality of first sub-coding units, and the step of performing motion vector prediction of each of the sub-coding units further comprises:
   calculating a weighted summation of the plurality of motion vectors to derive the motion vector of the specific sub-coding unit.

3. The method of claim 2, wherein the step of performing motion vector prediction of each of the sub-coding units further comprises:
   performing optimum Wiener filtering on the plurality of motion vectors to determine respective weighted parameters for the motion vectors, in order to generate the weighted summation.

4. The method of claim 2, wherein the step of performing motion vector prediction of each of the sub-coding units further comprises:
   determining respective weighted parameters for the motion vectors according to contents of at least one neighboring coding unit, in order to generate the weighted summation.

5. The method of claim 2, wherein the step of performing motion vector prediction of each of the sub-coding units further comprises:
   determining respective weighted parameters for the motion vectors according to contents of the plurality of first sub-coding units, in order to generate the weighted summation.

6. The method of claim 2, wherein the step of performing motion vector prediction of each of the sub-coding units further comprises:
   determining respective weighted parameters for the motion vectors by offline training, in order to generate the weighted summation.

7. The method of claim 2, wherein the step of performing motion vector prediction of each of the sub-coding units further comprises:
   determining respective weighted parameters for the motion vectors by online training, in order to generate the weighted summation.

8. The method of claim 1, wherein the at least one motion vector of the one or more first sub-coding units comprises a plurality of motion vectors of a plurality of first sub-coding units; and the step of performing motion vector prediction of each of the sub-coding units further comprises:
  calculating an average of the plurality of motion vectors to derive the motion vector of the specific sub-coding unit.

9. The method of claim 1, wherein the at least one motion vector of the one or more first sub-coding units comprises a plurality of motion vectors of a plurality of first sub-coding units; and the step of performing motion vector prediction of each of the sub-coding units further comprises:
  calculating a median of the plurality of motion vectors to derive the motion vector of the specific sub-coding unit.

10. The method of claim 1, wherein the step of performing motion vector prediction of each of the sub-coding units further comprises:
  calculating a median of motion vectors of a portion of the one or more second sub-coding units to derive a motion vector of another sub-coding unit.

11. The method of claim 1, wherein the step of processing the plurality of sub-coding units in the coding unit further comprises:
  determining a size of the specific sub-coding unit to be a transform size regarding video coding of the coding unit.

12. The method of claim 1, wherein the step of processing the plurality of sub-coding units in the coding unit further comprises:
  dividing the coding unit into the plurality of sub-coding units based on at least one mode of at least one neighboring coding unit.

13. The method of claim 1, wherein the step of processing the plurality of sub-coding units in the coding unit further comprises:
  dividing the coding unit into the plurality of sub-coding units based on contents of at least one neighboring coding unit.

14. The method of claim 1, wherein each of the one or more first sub-coding units or each of the one or more second sub-coding units is a coded sub-coding unit.

15. The method of claim 14, wherein the one or more first sub-coding units or the one or more second sub-coding units comprise at least one spatially coded sub-coding unit and/or at least one temporally coded sub-coding unit.

16. The method of claim 14, wherein each of the one or more first sub-coding units or each of the one or more second sub-coding units is a motion-compensated sub-coding unit.

17. The method of claim 1, wherein the at least one of the one or more first sub-coding units comprises the closest sub-coding unit within a left coding unit.

18. The method of claim 1, wherein the at least one of the one or more first sub-coding units comprises a collocated block with respect to the specific sub-coding unit in a previous coded frame.

19. An apparatus for performing local motion vector derivation during video coding of a coding unit, the apparatus comprising:
  a processing circuit arranged to perform video coding on the coding unit, wherein the processing circuit comprises:
    a preprocessing module arranged to process a plurality of sub-coding units in the coding unit and perform motion vector prediction of each sub-coding unit of the coding unit, wherein the preprocessing module derives a motion vector of a specific sub-coding unit of the sub-coding units by utilizing at least one motion vector of one or more first sub-coding units in the coding unit or other coding unit, and performs motion compensation on the specific sub-coding unit according to the motion vector of the specific sub-coding unit, wherein the preprocessing module derives a motion vector of another sub-coding unit in the coding unit by utilizing at least one motion vector of one or more second sub-coding units in the coding unit or other coding unit, wherein the specific sub-coding unit is not positioned in the corner of the coding unit, and at least one of the one or more first sub-coding units is not spatially adjacent to the specific sub-coding unit, and at least one of the one or more second sub-coding units is not spatially adjacent to the another sub-coding unit, and at least one of the at least one of the one or more second sub-coding unit is different from the at least one of the one or more first sub-coding unit; and
    at least one coding module arranged to perform video coding on the coding unit based on the motion compensation performed by the preprocessing module.

20. The apparatus of claim 19, wherein the at least one motion vector of the one or more first sub-coding units comprises a plurality of motion vectors of a plurality of first sub-coding units; and the preprocessing module calculates a weighted summation of the plurality of motion vectors to derive the motion vector of the specific sub-coding unit.

21. The apparatus of claim 20, wherein the preprocessing module performs optimum Wiener filtering on the plurality of motion vectors to determine respective weighted parameters for the motion vectors, in order to generate the weighted summation.

22. The apparatus of claim 20, wherein the preprocessing module determines respective weighted parameters for the motion vectors according to contents of at least one neighboring coding unit, in order to generate the weighted summation.

23. The apparatus of claim 20, wherein the preprocessing module determines respective weighted parameters for the motion vectors according to contents of the plurality of first sub-coding units, in order to generate the weighted summation.

24. The apparatus of claim 20, wherein the preprocessing module determines respective weighted parameters for the motion vectors by offline training, in order to generate the weighted summation.

25. The apparatus of claim 20, wherein the preprocessing module determines respective weighted parameters for the motion vectors by online training, in order to generate the weighted summation.

26. The apparatus of claim 19, wherein the at least one motion vector of the one or more first sub-coding units comprises a plurality of motion vectors of a plurality of first sub-coding units; and the preprocessing module calculates an average of the plurality of motion vectors to derive the motion vector of the specific sub-coding unit.

27. The apparatus of claim 19, wherein the at least one motion vector of the one or more first sub-coding units comprises a plurality of motion vectors of a plurality of first sub-coding units; and the preprocessing module calculates a median of the plurality of motion vectors to derive the motion vector of the specific sub-coding unit.

28. The apparatus of claim 19, wherein the preprocessing module calculates a median of motion vectors of a portion of the one or more second sub-coding units to derive a motion vector of another sub-coding unit.

29. The apparatus of claim 19, wherein the preprocessing module determines a size of the specific sub-coding unit to be a transform size regarding video coding of the coding unit.

30. The apparatus of claim 19, wherein the preprocessing module divides the coding unit into the plurality of sub-coding units based on at least one mode of at least one neighboring coding unit.

31. The apparatus of claim 19, wherein the preprocessing module divides the coding unit into the plurality of sub-coding units based on contents of at least one neighboring coding unit.

32. The apparatus of claim 19, wherein each of the one or more first sub-coding units or each of the one or more second sub-coding units is a coded sub-coding unit.

33. The apparatus of claim 32, wherein the at least one of the one or more first sub-coding units or the at least one of the one or more second sub-coding units comprises at least one spatially coded sub-coding unit and/or at least one temporally coded sub-coding unit.

34. The apparatus of claim 32, wherein each of the one or more first sub-coding units or each of the one or more second sub-coding units is a motion-compensated sub-coding unit.

\* \* \* \* \*